US010691892B2

United States Patent
Lee et al.

(10) Patent No.: US 10,691,892 B2
(45) Date of Patent: Jun. 23, 2020

(54) ONLINE CONTEXTUAL ADVERTISEMENT INTELLECTUALIZATION APPARATUS AND METHOD BASED ON LANGUAGE ANALYSIS FOR AUTOMATICALLY RECOGNIZING COINED WORD

(71) Applicant: Electronics and Telecommunications Research Institute, Daejeon (KR)

(72) Inventors: Chung Hee Lee, Daejeon (KR); Hyun Ki Kim, Daejeon (KR); Sang Kyu Park, Daejeon (KR); Kyung Man Bae, Daejeon (KR); Yong Jin Bae, Daejeon (KR); Ji Hyun Wang, Sejong-si (KR); Hyung Jik Lee, Daejeon (KR); Soo Jong Lim, Daejeon (KR); Joon Ho Lim, Daejeon (KR); Myung Gil Jang, Daejeon (KR); Mi Ran Choi, Daejeon (KR); Jeong Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 59 days.

(21) Appl. No.: 15/704,254

(22) Filed: Sep. 14, 2017

(65) Prior Publication Data
US 2018/0267957 A1    Sep. 20, 2018

(30) Foreign Application Priority Data

Mar. 14, 2017 (KR) .................. 10-2017-0031766

(51) Int. Cl.
*G06F 40/289*    (2020.01)
*G06F 40/242*    (2020.01)
(Continued)

(52) U.S. Cl.
CPC .......... *G06F 40/289* (2020.01); *G06F 40/242* (2020.01); *G06F 40/268* (2020.01); *G06F 40/284* (2020.01)

(58) Field of Classification Search
CPC ............. G06F 17/2755; G06F 17/2775; G06F 17/277; G06F 17/3089
See application file for complete search history.

(56) References Cited

U.S. PATENT DOCUMENTS

| 5,794,177 A * | 8/1998 | Carus ................... G06F 17/274 704/10 |
| 2006/0100856 A1* | 5/2006 | Kang .................. G06F 17/2735 704/9 |

(Continued)

FOREIGN PATENT DOCUMENTS

| KR | 10-2002-0054254 | 7/2002 |
| KR | 10-2008-0029567 | 4/2008 |

(Continued)

OTHER PUBLICATIONS

Bogyum Kim, et. al., "Probabilistic Segmentation and Tagging of Unknown Words"; Journal of Korean Information Science Society, vol. 43, No. 4, Apr. 2016, pp. 430-436.

*Primary Examiner* — Richemond Dorvil
*Assistant Examiner* — Oluwadamilola M Ogunbiyi
(74) *Attorney, Agent, or Firm* — Kile Park Reed & Houtteman PLLC

(57) ABSTRACT

The language analysis method includes collecting an online document, performing coined word filtering on the collected document based on a predetermined coined word extraction pattern and a dictionary to extract a coined word candidate which corresponds to the coined word extraction pattern and is not registered in a coined stop word dictionary, performing morpheme analysis on the extracted coined word candidate to verify a coined word candidate which does not correspond to a predetermined part of speech and is not registered in a pre-stored morpheme dictionary, refining the coined word extraction pattern, based on a result of the verification and updating the verified coined word candidate (Continued)

in the coined stop word dictionary, and updating the verified coined word candidate in the morpheme dictionary, based on the result of the verification.

10 Claims, 10 Drawing Sheets

(51) Int. Cl.
*G06F 40/268* (2020.01)
*G06F 40/284* (2020.01)

(56) References Cited

U.S. PATENT DOCUMENTS

| | | | | |
|---|---|---|---|---|
| 2007/0150260 A1* | 6/2007 | Lee | ............... | G06F 17/2818 704/2 |
| 2007/0233462 A1* | 10/2007 | Kim | ............... | G06F 40/268 704/9 |
| 2009/0157384 A1* | 6/2009 | Toutanova | ............... | G06F 17/2755 704/9 |
| 2010/0094845 A1 | 4/2010 | Moon et al. | | |
| 2010/0324991 A1* | 12/2010 | Colledge | ............... | G06F 17/30867 705/14.49 |
| 2014/0058984 A1* | 2/2014 | Shinzato | ............... | G06F 16/5866 706/12 |
| 2016/0104478 A1* | 4/2016 | Seo | ............... | G10L 15/08 704/244 |
| 2016/0132485 A1 | 5/2016 | Lee et al. | | |
| 2016/0203147 A1* | 7/2016 | Ikeda | ............... | H04L 51/16 715/234 |
| 2017/0161369 A1* | 6/2017 | Shibata | ............... | H04L 51/12 |

FOREIGN PATENT DOCUMENTS

| | | |
|---|---|---|
| KR | 10-2010-0073182 | 7/2010 |
| KR | 10-1526872 | 6/2015 |
| KR | 10-2016-0056983 | 5/2016 |

\* cited by examiner

ONLINE CONTEXTUAL ADVERTISEMENT INTELLECTUALIZATION APPARATUS AND METHOD BASED ON LANGUAGE ANALYSIS FOR AUTOMATICALLY RECOGNIZING COINED WORD

CROSS-REFERENCE TO RELATED APPLICATIONS

This application claims priority under 35 U.S.C. § 119 to Korean Patent Application No. 10-2017-0031766, filed on Mar. 14, 2017, the disclosure of which is incorporated herein by reference in its entirety.

TECHNICAL FIELD

The present invention relates to an apparatus and method of processing an online contextual customized advertisement based on a morpheme analysis result.

BACKGROUND

A morpheme denotes a minimum unit having a meaning in linguistics, and a morphological analyzer performs a function of analyzing a text by a morpheme unit the most suitable for a context. Generally, the morphological analyzer may be divided into a method based on a rule and a dictionary and a method based on machine learning.

In relevant technology, "probabilistic segmentation and tagging of unknown words (Bogyum Kim, Jae Sung Lee, 2016)" has proposed a method of segmenting and tagging coined words in the 3-step probabilistic morphological analysis. In detail, a segmentation and tagging method for unknown Korean words has been proposed for the 3-step probabilistic morphological analysis. For guessing unknown word, it uses rich suffixes that are attached to open class words, such as general nouns and proper nouns. The inventors have proposed a method to learn the suffix patterns from a morpheme tagged corpus, and calculate their probabilities for unknown open word segmentation and tagging in the probabilistic morphological analysis model. In such a method, a coined word pattern is learned and is combined with a conventional morpheme tagging model to increase a tagging performance for coined words, but an adverse effect occurs in general documents, causing the reduction in performance.

In another relevant technology, U.S. Pat. No. 8,275,607 (Title of the Invention: semi-supervised part-of-speech tagging) has proposed a method that allocates a part of speech to each word based on dictionaries, calculates a Baysian probability value of words unlisted in dictionaries by using surrounding context information as attributes, and allocates the most suitable part of speech. However, the method needs a dictionary and a learning set established through a manual process, and for this reason, if the field is changed, performance is reduced.

SUMMARY

Accordingly, the present invention provides an apparatus and a method, which automatically extract a coined word having a high probability that abnormal analysis is performed when analyzing a morpheme, improve a morpheme analysis performance based on the extracted coined word, and improve online context customized advertisement technology by using an improved morphological analyzer.

The present invention also provides an apparatus and a method, which perform a morpheme analysis-based automatic verification for extracting only coined words, which cause an actual morpheme analysis error, from among extracted coined words, perform a manual verification on a coined word which has passed the automatic verification, and improve context customized advertisement technology of the advertisement field, where coined words appear frequently, by using a morphological analyzer which is obtained by improving a performance of each of a coined word extractor and a morphological analyzer based on a result of the manual verification.

The objects of the present invention are not limited to the aforesaid, but other objects not described herein will be clearly understood by those skilled in the art from descriptions below.

In one general aspect, a language analysis apparatus for processing coined word recognition includes: a document collector collecting an online document; a coined word extractor performing coined word filtering on the collected document based on a predetermined coined word extraction pattern and a dictionary to extract a coined word candidate which corresponds to the coined word extraction pattern and is not registered in a coined stop word dictionary; a coined word verifier performing morpheme analysis on the extracted coined word candidate to verify a coined word candidate which does not correspond to a predetermined part of speech and is not registered in a pre-stored morpheme dictionary; a coined word extraction improver refining the coined word extraction pattern, based on a verification result of the coined word verifier and updating the verified coined word candidate in the coined stop word dictionary; and a morpheme analysis improver updating the verified coined word candidate in the morpheme dictionary, based on the verification result of the coined word verifier.

In another general aspect, a contextual advertisement intellectualization apparatus including the language analysis apparatus includes: a document collector collecting an online document which is to be advertised; a language analyzer performing morpheme analysis on the collected online document by using the language analysis apparatus; a keyword extractor extracting at least one keyword, based on a result of the morpheme analysis; an advertisement matcher extracting advertisement targets matching the extracted at least one keyword from among registered advertisement targets; and an advertisement recommender recommending an advertisement corresponding to an advertisement target, having a highest correlation with the extracted at least one keyword, from among the extracted advertisement targets.

In another general aspect, a language analysis method based on a language analysis apparatus for processing coined word recognition includes: collecting an online document; performing coined word filtering on the collected document based on a predetermined coined word extraction pattern and a dictionary to extract a coined word candidate which corresponds to the coined word extraction pattern and is not registered in a coined stop word dictionary; performing morpheme analysis on the extracted coined word candidate to verify a coined word candidate which does not correspond to a predetermined part of speech and is not registered in a pre-stored morpheme dictionary; refining the coined word extraction pattern, based on a result of the verification and updating the verified coined word candidate in the coined stop word dictionary; and updating the verified coined word candidate in the morpheme dictionary, based on the result of the verification.

In another general aspect, a contextual advertisement intellectualization method based on a language analysis method of processing coined word recognition includes: collecting an online document which is to be advertised; performing morpheme analysis on the collected online document, based on the processing of the coined word recognition; extracting at least one keyword, based on a result of the morpheme analysis; extracting advertisement targets matching the extracted at least one keyword from among registered advertisement targets; and recommending an advertisement corresponding to an advertisement target, having a highest correlation with the extracted at least one keyword, from among the extracted advertisement targets, wherein the language analysis method includes: collecting an online document; performing coined word filtering on the collected document based on a predetermined coined word extraction pattern and a dictionary to extract a coined word candidate which corresponds to the coined word extraction pattern and is not registered in a coined stop word dictionary; performing morpheme analysis on the extracted coined word candidate to verify a coined word candidate which does not correspond to a predetermined part of speech and is not registered in a pre-stored morpheme dictionary; refining the coined word extraction pattern, based on a result of the verification and updating the verified coined word candidate in the coined stop word dictionary; and updating the verified coined word candidate in the morpheme dictionary, based on the result of the verification.

Other features and aspects will be apparent from the following detailed description, the drawings, and the claims.

DETAILED DESCRIPTION OF EMBODIMENTS

Figure 1:
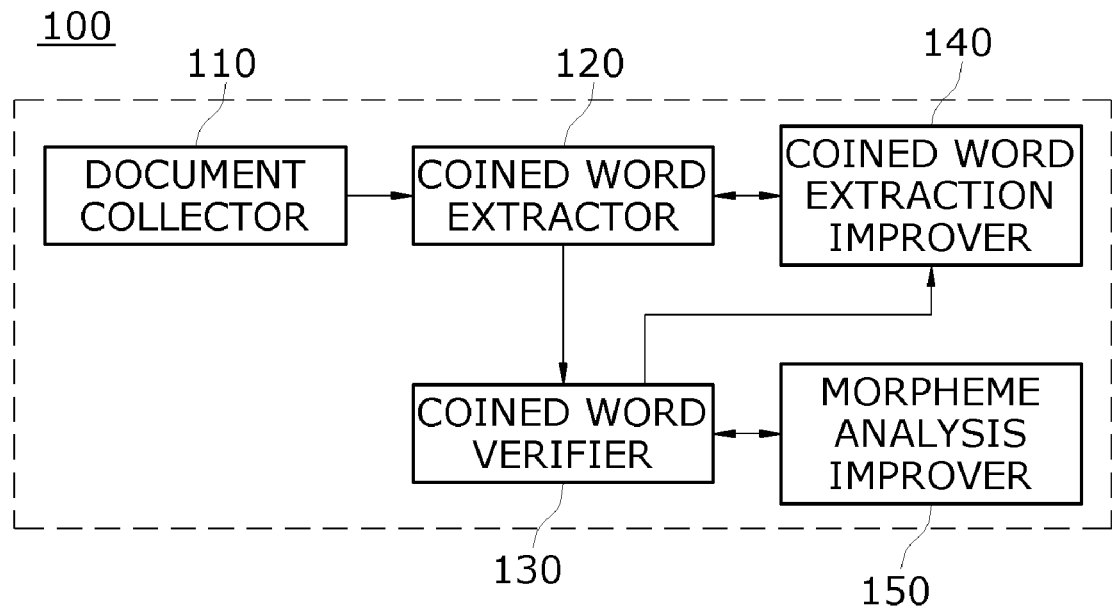
FIG. 1 is a block diagram of a language analysis apparatus for automatically recognizing coined words, according to an embodiment of the present invention.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout. Also, in providing description with reference to the drawings, although elements are represented by the same name, reference numeral referring to the elements may be changed, and reference numerals are merely described for convenience of description. It should not be construed that concepts, features, functions, or effects of elements are limited by reference numerals.

In this disclosure below, when it is described that one comprises (or includes or has) some elements, it should be understood that it may comprise (or include or has) only those elements, or it may comprise (or include or have) other elements as well as those elements if there is no specific limitation. The present invention may, however, be embodied in many different forms and should not be construed as being limited to the embodiments set forth herein. The meaning of 'comprise', 'include', or 'have' specifies a property, a region, a fixed number, a step, a process, an element and/or a component but does not exclude other properties, regions, fixed numbers, steps, processes, elements and/or components.

In the present specification, each of terms such as " . . . unit", " . . . apparatus" and "module" described in specification denotes an element for performing at least one function or operation, and may be implemented in hardware, software or the combination of hardware and software.

Hereinafter, a language analysis apparatus which improved morpheme analysis performance based on automatic coined word extraction according to an embodiment of the present invention will be described in detail with reference to FIGS. 1 to 5. The language analysis apparatus which will be described below with reference to FIGS. 1 to 5 may be included in an online contextual advertisement intellectualization apparatus according to an embodiment of the present invention.

FIG. 1 is a block diagram of a language analysis apparatus 100 for automatically recognizing coined words, according to an embodiment of the present invention.

Figure 2:
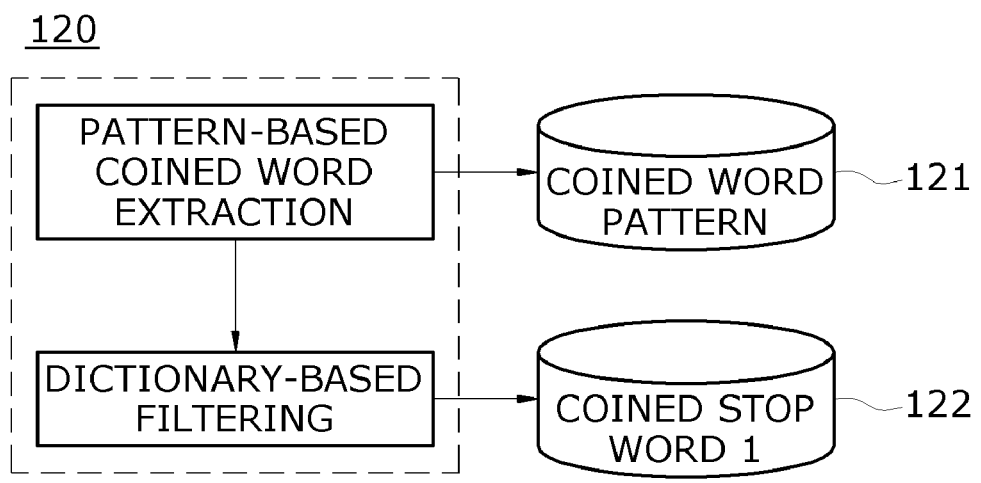
FIG. 2 is a block diagram for describing a coined word extractor illustrated in FIG. 1.
Figure 3:
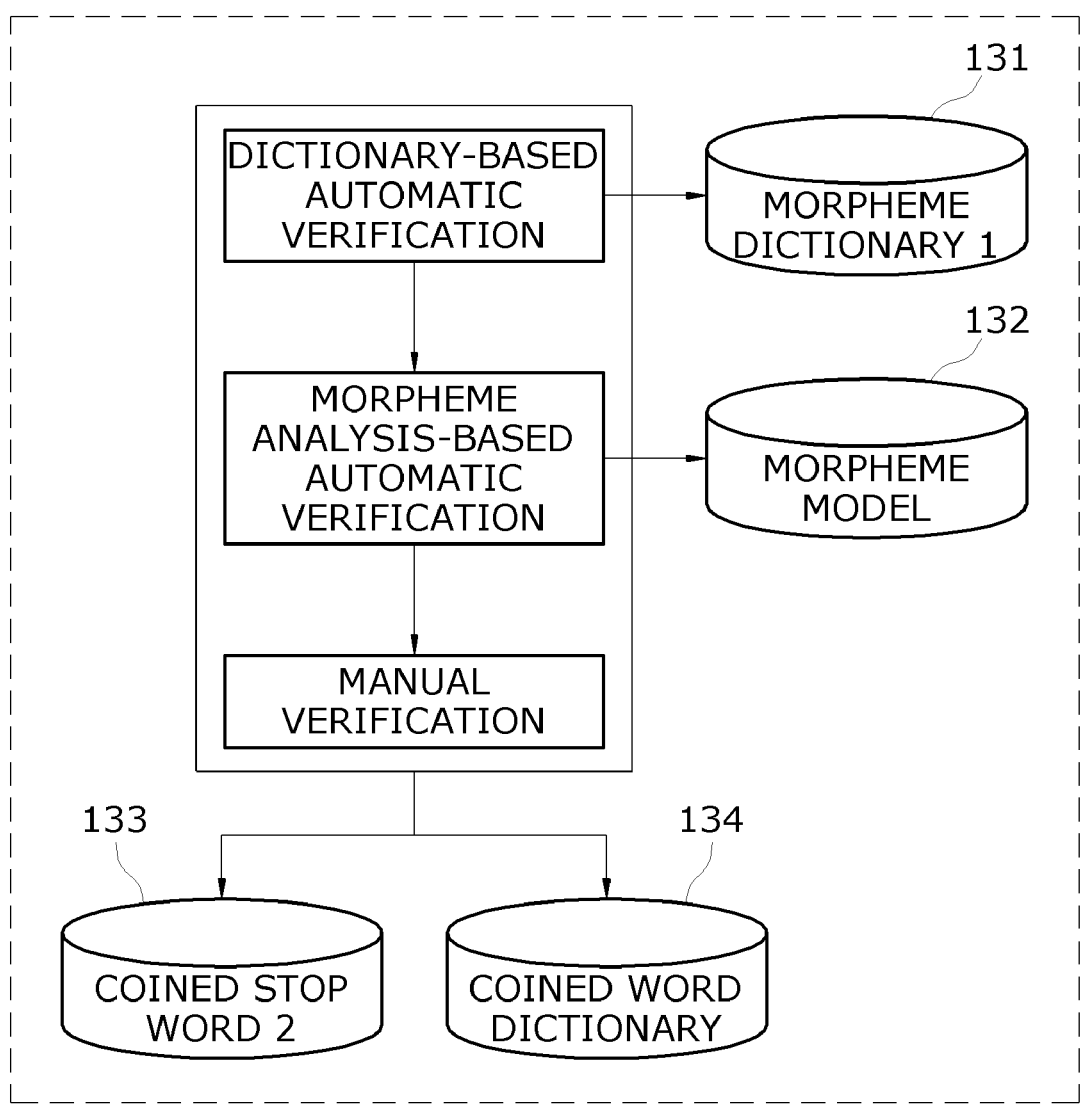
FIG. 3 is a block diagram for describing a coined word verifier illustrated in FIG. 1.
Figure 4:
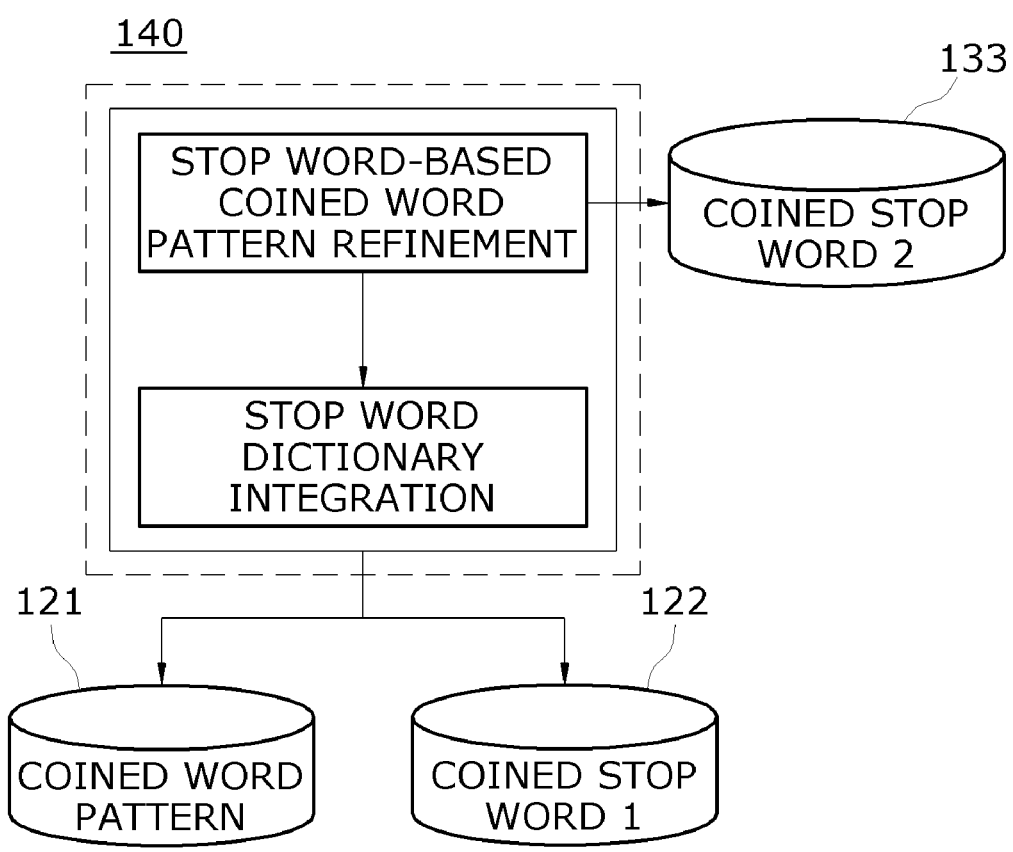
FIG. 4 is a block diagram for describing a coined word extraction improver illustrated in FIG. 1.
Figure 5:
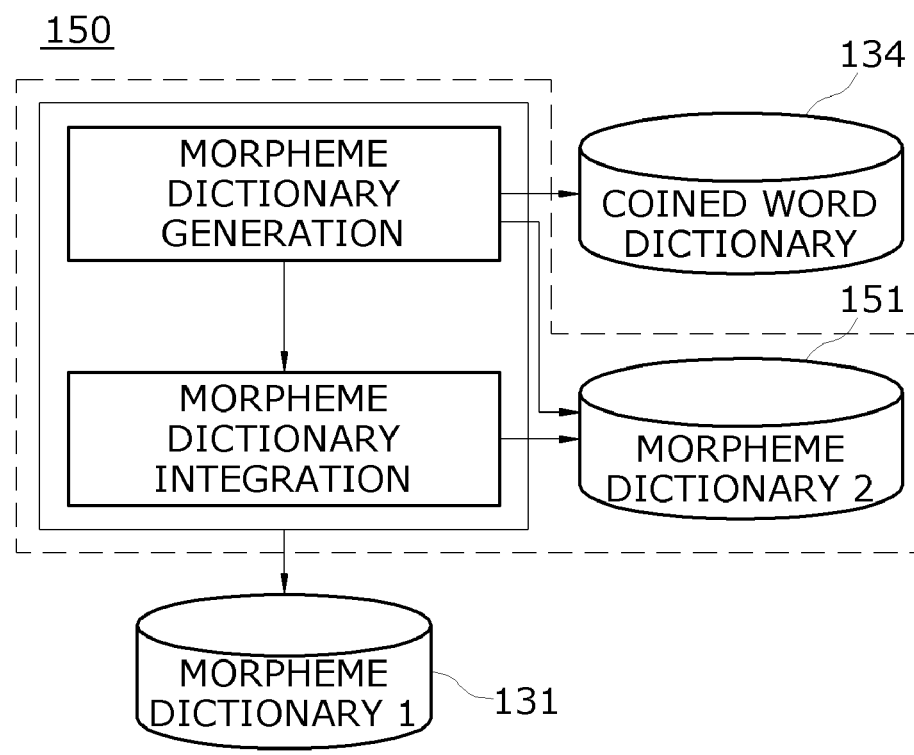
FIG. 5 is a block diagram for describing a morpheme analysis improver illustrated in FIG. 1.

FIG. 2 is a block diagram for describing a coined word extractor illustrated in FIG. 1. FIG. 3 is a block diagram for describing a coined word verifier illustrated in FIG. 1. FIG. 4 is a block diagram for describing a coined word extraction improver illustrated in FIG. 1. FIG. 5 is a block diagram for describing a morpheme analysis improver illustrated in FIG. 1.

First, as illustrated in FIG. 1, the language analysis apparatus 100 may include a document collector 110, a coined word extractor 120, a coined word verifier 130, a coined word extraction improver 140, and a morpheme analysis improver 150.

The document collector 110 may collect a target document which coined words are to be extracted from.

A document collection target, a collection method, and collection technology of the document collector 110 are not limited to a specific target, method, and technology. For example, the document collector 110 may randomly collect sentences from online text documents, and moreover, may collect sentences which are input as queries by an arbitrary user.

The coined word extractor 120 may extract a coined word appearing in sentences which are results of the document collection.

Referring to FIG. 2, the coined word extractor 120 may perform a pattern-based coined word extraction operation as a first step and may perform a dictionary-based filtering operation as a second step.

An operation and a process which are performed in the pattern-based coined word extraction operation are as follows.

A pattern for extracting coined words may be configured based on "surrounding words" such as a postposition and an ending which are used along with the coined words. Such a coined word extraction pattern may be configured in various methods, and is not limited to one method.

In an embodiment of the present invention, it is assumed that a noun coined word is extracted based on "postposition". Since most of nouns are used along with postpositions, the other parts except a part capable of becoming a postposition from an end in each syntactic word may be used as nouns and may be assumed as coined word candidates.

For example, when a sentence "무선분리형임이 강조된 애플의 이어폰 에어팟이 애플 스토어에 상륙했다" is collected, a list of "postpositions" may include " 이, 의, 에 ". A result obtained by extracting syntactic word-based coined words based on the list is shown in the following Table 1.

TABLE 1

| Syntatic Word | Postposition | Coined Word Candidates |
|---|---|---|
| 무선분리형임이 | 이 | 무선분리형임 |
| 강조된 | X | X |
| 애플의 | 의 | 애플 |
| 이어폰 | X | X |
| 에어팟이 | 이 | 에어팟 |
| 애플스토어에 | 에 | 애플스토어 |
| 상륙했다 | X | X |

In the sentence, '무선분리형임', '애플', '에어팟', and '애플스토어' may be extracted as the coined word candidates.

A coined word pattern database (DB) 121 applied to the pattern-based coined word extraction operation may be included in the coined word extractor 120, but may be provided in a separate storage space of the language analysis apparatus 100 without being limited thereto.

An operation and a process which are performed in the dictionary-based filtering operation will be described below.

In a dictionary-based coined word extraction operation, the coined word candidates extracted in the pattern-based coined word extraction operation may be filtered based on a coined stop word dictionary. In this case, a stop word dictionary may be a list which is extracted as a noun although not a noun. For example, when it is assumed that '무선분리형임' is not included in stop words included in the stop word dictionary, any one of the coined word candidates is not filtered in the dictionary-based filtering operation. Therefore, ' 무선분리형임 ', ' 애플 ', ' 에어팟 ', and ' 애플스토어 ' may be selected as final coined word candidates.

A coined stop word database 122 (illustrated as "coined stop word 1 database" in FIG. 2) applied to the dictionary-based filtering operation may be included in the coined word extractor 120, but may be provided in a separate storage space of the language analysis apparatus 100 without being limited thereto.

Returning again to FIG. 1, the coined word verifier 130 may perform a function of automatically and manually verifying words extracted as coined words by the coined word extractor 120. Referring again to FIG. 3, the coined word verifier 130 may perform a dictionary-based automatic verification operation as a first step, a morpheme analysis-based automatic verification operation as a second step, and a manual verification operation as a third step.

First, in the dictionary-based automatic verification operation, coined words extracted by the coined word extractor 120 may be filtered based on a morpheme dictionary 131 (illustrated as "morpheme dictionary 1 database" in FIG. 3). The morpheme dictionary may be a dictionary applied to a morphological analyzer, and in this case, words previously registered in the morpheme dictionary may be excluded from coined word candidates. For example, when it is assumed that ' 애플 ' is registered in the morpheme dictionary, ' 애플 ' may be excluded from the coined word candidates, and only ' 무선분리형임 ', ' 에어팟 ' and ' 애플스토어 ' may be left.

Subsequently, in the morpheme analysis-based automatic verification operation, verification may be automatically performed based on a morphological analyzer 132 (illustrated as "morpheme model database" in FIG. 3). In this case, a morpheme analysis may be performed on an original sentence from which a coined word is extracted. When a morpheme analysis result for coined word candidates is analyzed as a noun, the verification may be determined as pass, but when the morpheme analysis result is analyzed as a part of speech instead of a noun, the verification may be determined as fail.

For example, it is assumed that a morpheme analysis result for an exercise sentence from which a coined word candidate is extracted is as follows. That is, when the exercise sentence is "무선분리형임이 강조된 애플의 이어폰 에어팟이 애플스토어에 상륙했다", a morpheme analysis result for the exercise sentence is shown in the following Table 2.

TABLE 2

| Syntactic Word | Morpheme Analysis Result |
|---|---|
| 무선분리형임이 | 무선/noun + 분리형/noun + 임/vcp + ㄴ/etn + 이/jks |
| 강조된 | 강조/noun + 되/xsv + ㄴ/etm |
| 애플의 | 애플/noun + 의/jkg |
| 이어폰 | 이어폰/noun |
| 에어팟이 | 에어/noun + 팟이/noun |
| 애플스토어에 | 애플스토어/noun + 에/jkb |
| 상륙했다 | 상륙/noun + 히/xsv + 었/ep + 다/ef + ./s |

In defining a part of speech, noun, vcp (predicative postposition), etn (noun changing ending), jks (nominative postposition), xsv (deverbative suffix), etm (prenoun changing ending), jkg (genitive postposition), jkb (adverbial postposition), ep (prefinal ending), ef (final ending), and s (symbol) may be listed in Table 2.

Moreover, an automatic verification result for each of coined word candidates is shown in the following Table 3.

TABLE 3

| Syntactic Word | Morpheme Analysis Result | Verification Result |
|---|---|---|
| 무선분리형 | 무선/noun + 분리형/noun + ㅇ/vcp + ㅁ/etn + 이/jks | Fail |
| 에어팟 | 에어/noun + 팟이/noun | Fail |
| 애플스토어 | 애플스토어/noun + 에/jkb | Pass |

As shown in Table 3, '무선분리형임' and '에어팟' of the coined word candidates are not analyzed as a noun, and thus, are determined as verification fail. In the coined word candidates, '애플스토어' is analyzed as a noun, and thus, is determined as verification pass.

Finally, in the manual verification operation, coined word candidates which are determined as fail in the automatic verification operations may be manually verified. In detail, when a coined word candidate is analyzed as a noun as a result of morpheme analysis and thus is determined as verification pass, morpheme analysis and coined word extraction may not secondarily be performed, and the coined word candidate may be excluded from manual verification. On the other hand, when coined word candidates are determined as fail in automatic verification, this may be classified into two cases as shown in the following Table 4, and the two cases may be manually verified according to different processing methods.

TABLE 4

| Division | Explanation | Processing Method |
|---|---|---|
| Case 1 | Case where a coined word noun candidate is a noun | Case where improvement of morpheme analysis performance is necessary, and a coined word dictionary is generated so as to be used as a morpheme dictionary for improvement of morpheme analysis performance |
| Case 2 | Case where a coined word noun candidate is not a noun | Error of a coined word extractor extracting nouns, and a coined stop word dictionary is generated for improvement of morpheme analysis performance |

For example, '에어팟' of coined word candidates may correspond to the case 1 and thus may be stored in a coined word dictionary database 134, and '무선분리형임' may correspond to the case 2 and thus may be stored in a coined stop word dictionary 133 (illustrated as "coined stop word 2 database" in FIG. 3).

Returning again to FIG. 1, by using the coined stop word dictionary 133 (i.e., the "coined stop word 2 database" of FIG. 3) generated by the coined word verifier 130, the coined word extraction improver 140 may refine a coined word extraction pattern and may extend the coined stop word dictionary.

In detail, referring to FIG. 4, the coined word extraction improver 140 may first perform a coined stop word-based coined word pattern refining operation as an operation of improving the coined word extractor 120 and may second perform a coined stop word integration operation.

First, the coined stop word-based coined word pattern refining operation may process a case corresponding to the case 2 in the manual verification operation. That is, when the coined word extractor 120 extracts a noun coined word but the noun coined word is not a noun, the extracted noun coined word may be stored in the coined stop word dictionary 133 (i.e., the "coined stop word 2 database"). Therefore, based on the '무선분리형임' stored in the coined stop word dictionary 133, the coined stop word-based coined word pattern refining operation may refine a relevant pattern so as not to extract a word having a similar type as a coined word candidate. At this time, the coined word extraction improver 140 may correct the coined word pattern database 121, which is a previous coined word extraction pattern dictionary, of the coined word extractor 120 to effect an update.

Subsequently, the coined stop word dictionary integration operation may be an operation of integrating a coined stop word dictionary for excluding coined words, which are not a noun coined word, from the coined word extractor 120. In the coined stop word dictionary integration operation, content of a new coined stop word dictionary 133 (i.e., the coined stop word 2 database) may be added to the coined word pattern database 121, which is a previous coined word extraction pattern dictionary, of the coined word extractor 120. For example, since the '무선분리형임' is extracted as a new coined stop word, the '무선분리형임' may be added to the coined stop word 1 database which is a previous dictionary.

Returning again to FIG. 1, the morpheme analysis improver 150 may generate a morpheme dictionary by using the coined word dictionary 134 generated by the coined word verifier 130, thereby performing a function of improving a performance of a morphological analyzer.

Referring to FIG. 5, the morpheme analysis improver 150 may perform a morpheme dictionary generation operation as a first step and may perform a morpheme dictionary integration operation as a second step.

First, in the morpheme dictionary generation operation, a processing target may be a case corresponding to the case 1 in a manual operation performed by the coined word verifier 130. That is, the case may be a case where a coined word candidate is a noun actually but is not analyzed as a noun by the morphological analyzer, the coined word candidate may be stored in a coined word dictionary in the manual operation. In the morpheme dictionary generation operation, '에어팟' which is stored in the coined word dictionary 134 in the manual operation may be generated as a morpheme dictionary 131 (i.e., the morpheme dictionary 1 database). In this case, the morpheme dictionary 131 may be a dictionary applied to the morphological analyzer, and registered words may be used for analyzing morphemes. A format of the morpheme dictionary 1 131 may be diversified depending on the morphological analyzer, and is not limited to one type.

For example, in the manual operation performed by the coined word verifier 130, a target corresponding to the case 1 may be stored in the morpheme dictionary 1 131 in order for a word to match a correspond part of speech as in the following Table 5.

TABLE 5

| 에어팟 NOUN |
|---|

Subsequently, in the morpheme dictionary integration operation, a newly generated morpheme dictionary 151 (illustrated as "morpheme dictionary 2 database in FIG. 5) may be additionally integrated into content of the morpheme dictionary 1 131 which is previously used in the morphological analyzer. For example, this may be shown in the following Table 6.

TABLE 6

| 삼성전자 NOUN |
|---|
| 애플 NOUN |
| 에어팟 NOUN |

The morpheme dictionary 2 151 generated through the above-described operation may be used in the morphological analyzer, and thus, a previously misanalysed sentence may be accurately analyzed as follows. That is, a syntactic word "에어팟이" may be analyzed as "에어팟/noun+ 이/jks" in a collected sentence.

The language analysis apparatus 100 according to an embodiment of the present invention solves a problem where a morpheme of a coined word which is not included in a dictionary or learning data is not accurately analyzed, and thus, may be applied to the advertisement field where a number of coined words appear. Contextual customized advertisement technology which is significant technology in the advertisement field may be technology for recommending an advertisement suitable for context of a body text such as news articles, and in the contextual customized advertisement technology, morpheme analysis technology may perform an essential function. Therefore, the language analysis apparatus 100 according to an embodiment of the present invention improves a customized advertisement recommending function by using the contextual customized advertisement technology.

Hereinafter, a contextual advertisement intellectualization apparatus and an intellectualization service method thereof according to an embodiment of the present invention will be described in detail with reference to FIGS. 6 to 9.

Figure 6:
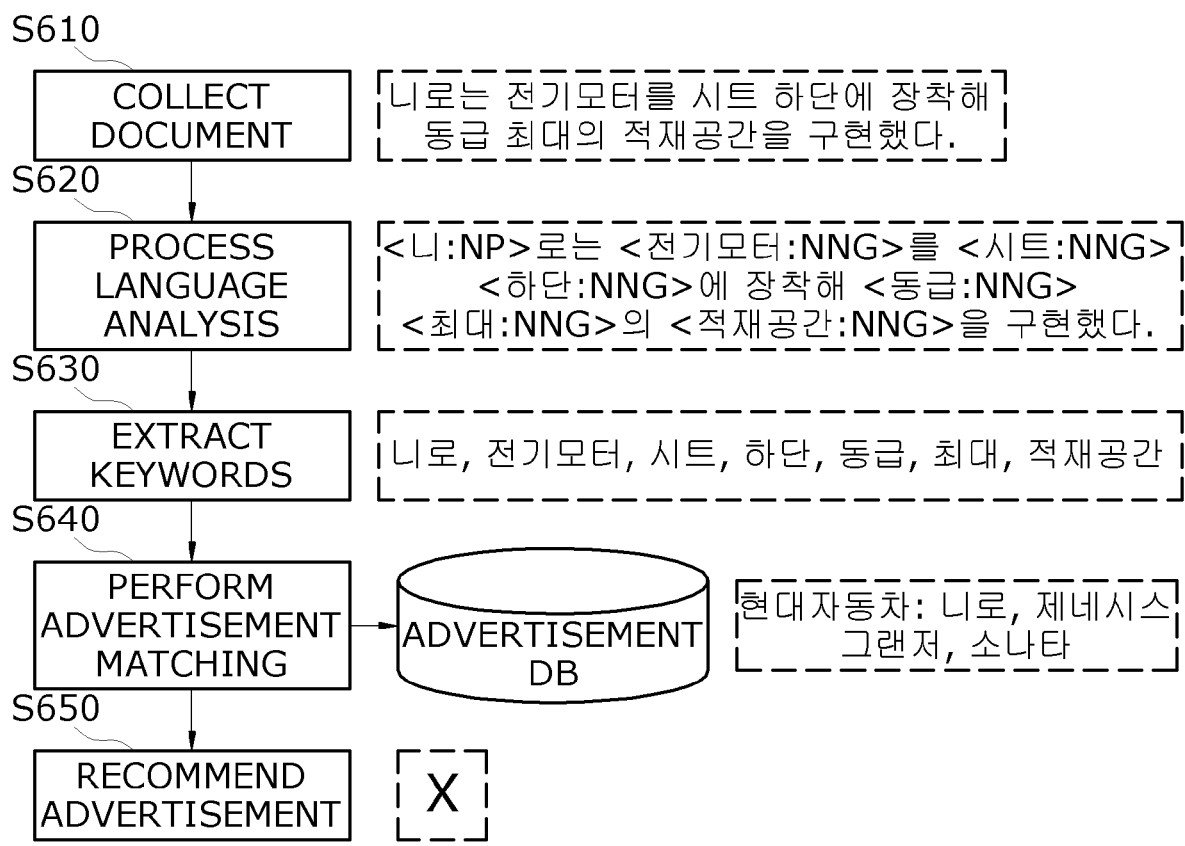
FIG. 6 is a diagram for describing an example of misanalysis based on a general context customized advertising method.

FIG. 6 is a diagram for describing an example of misanalysis based on a general context customized advertising method.

In FIG. 6, a conventionally overall flow of the contextual customized advertisement technology and a misanalysed example where morpheme analysis is not normally performed based on coined words are illustrated.

First, a document may be collected in step S610.

For example, the collected document may be a part of a news article associated with vehicles, and a sentence "니로는 전기모터를 시트 하단에 장착해 동급 최대의 적재공간을 구현했다" may be a processing target.

Subsequently, language analysis may be performed in step S620.

In this case, as a processing result obtained in step S620, a result obtained by performing morpheme analysis on content of the collected document may be shown in the following Table 7.

TABLE 7

| <니:NP>로는 <전기모터:NNG>를 <시트:NNG> <하단:NNG>에 장착해 <동급:NNG> <최대:NNG>의<적재공간:NNG>을 구현했다. |
|---|

That is, " 니 " in "니로는" may be analyzed as a pronoun. For reference, in Table 7, only an example of each of a general noun (NNG) and a pronoun (NP) is shown, and a morpheme analysis result is not limited thereto. In other embodiments, classifications applied to general morpheme analysis may all be used.

Subsequently, keyword extraction may be performed based on a result of the language analysis in step S630.

In a keyword extraction operation, an essential keyword for recommending an advertisement suitable for content of the document may be extracted, and a noun may be extracted as the essential keyword.

As a processing result obtained in step S630, a result of the keyword extraction may be shown in the following Table 8.

TABLE 8

| 니, 전기모터, 시트, 하단, 동급, 최대, 적재공간 |
|---|

Moreover, keywords associate with an advertisement target which is to be advertised by an advertisement provider may be previously stored in an advertisement database, and in step S640, advertisement matching suitable for the document content among advertisement targets registered in the advertisement database may be performed based on the keyword extraction result.

For example, various advertisement targets registered by vehicle-related advertisement providers may be stored in the advertisement database. In FIG. 6, an example where advertisement targets such as "'니로, 제네시스, 그랜저, 소나타" are stored in association with "현대자동차" is illustrated.

Subsequently, advertisement recommendation may be performed based on a result of the advertisement matching in step S650.

The advertisement recommendation operation may calculate a suitable level matching the document content, based on keyword-based priorities of advertisements selected through the advertisement matching and may finally recommend an advertisement the most suitable for the document content. However, a significant advertisement target keyword may not be included in keywords extracted based on an analysis result which is obtained in step S620. That is, in a collected sentence content, '니로' which is a vehicle model may be a significant keyword, but a pronoun '니' may be analyzed through morpheme analysis in the language analysis processing operation, whereby the morpheme analysis may be a case where the advertisement matching fails.

In order to solve such a problem, the contextual advertisement intellectualization apparatus according to an embodiment of the present invention may include a language analyzer corresponding to the language analysis apparatus 100 described above with reference to FIGS. 1 to 5.

Figure 7:
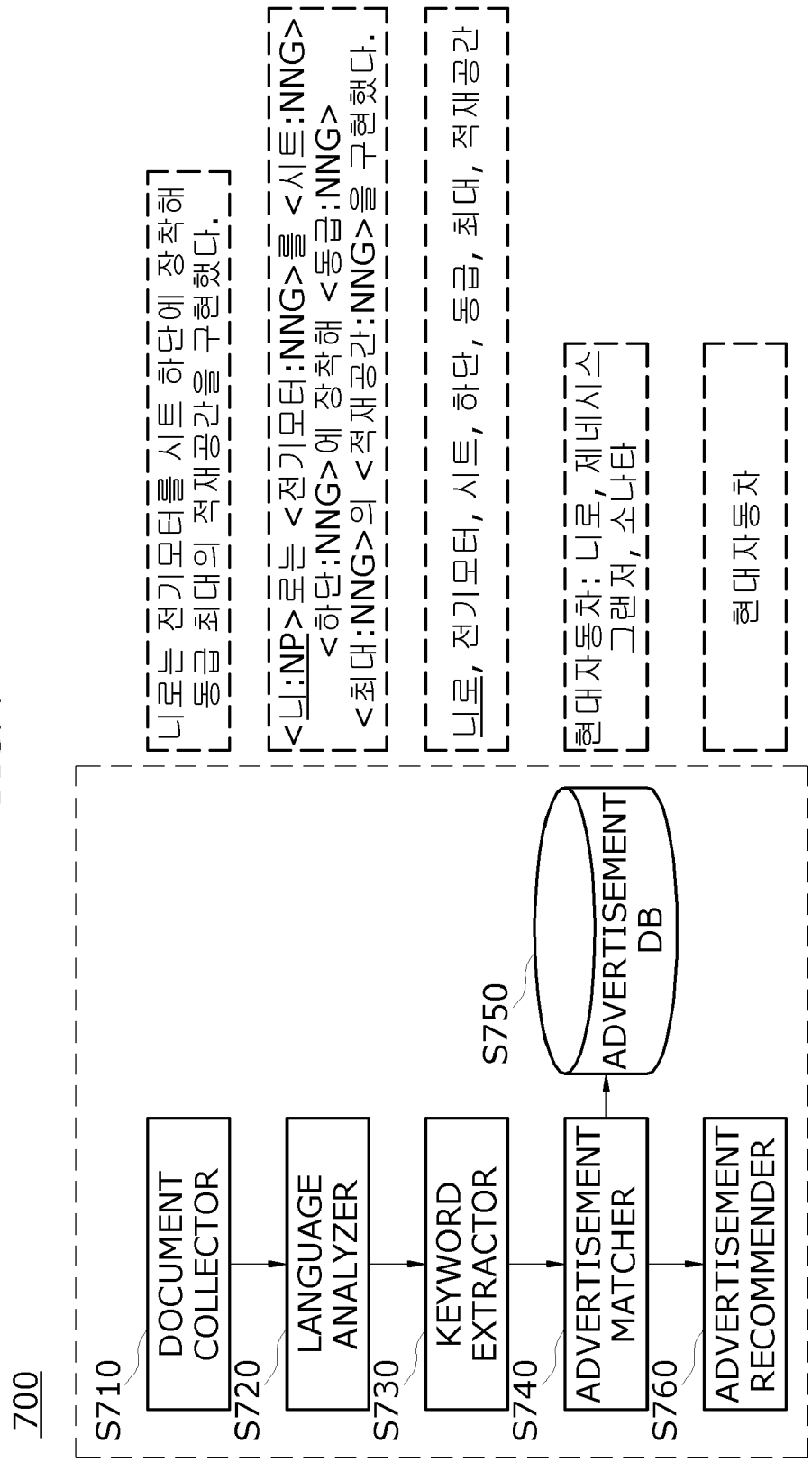
FIG. 7 is a block diagram of a contextual advertisement intellectualization apparatus according to an embodiment of the present invention.
Figure 8:
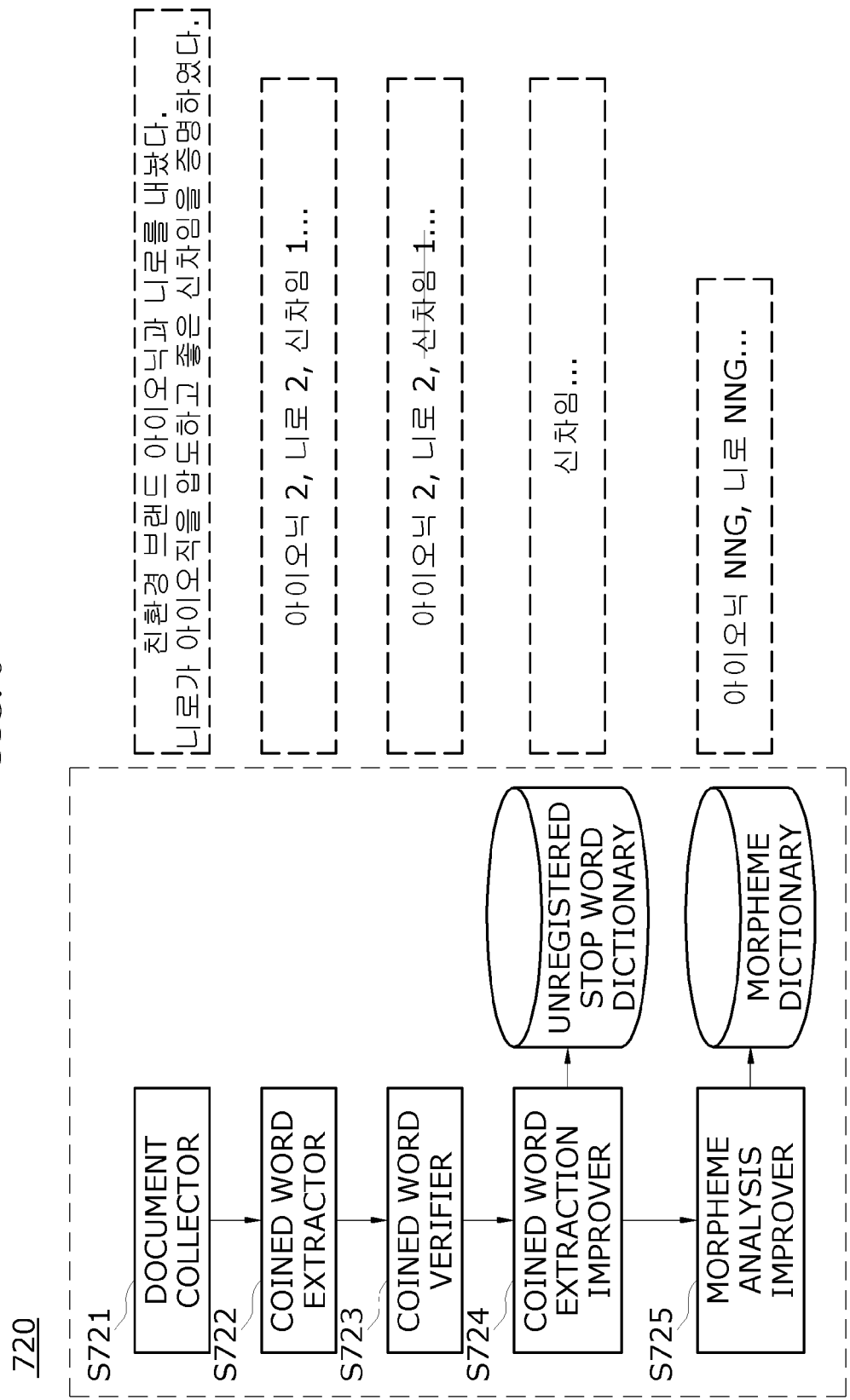
FIG. 8 is a block diagram for describing a method of applying the language analysis apparatus of FIG. 1 to a contextual advertisement intellectualization apparatus according to an embodiment of the present invention.

FIG. 7 is a block diagram of a contextual advertisement intellectualization apparatus 700 according to an embodiment of the present invention. FIG. 8 is a block diagram for describing a method of applying the language analysis apparatus of FIG. 1 to the contextual advertisement intellectualization apparatus 700 according to an embodiment of the present invention.

As illustrated in FIG. 7, the contextual advertisement intellectualization apparatus 700 may include a document collector 710, a language analyzer 720, a keyword extractor 730, an advertisement matcher 740, an advertisement database 750, and an advertisement recommender 760. In this case, the document collector 710, the language analyzer 720, the keyword extractor 730, the advertisement matcher 740, and the advertisement recommender 760 of the contextual advertisement intellectualization apparatus 700 may perform processing including operations corresponding to the contextual customized advertisement recommendation operation (S810 to S650) described above with reference to FIG. 6. The language analyzer 720 may perform processing differentiated from the contextual customized advertisement recommendation operation (S620).

That is, as illustrated in FIG. 8, the language analyzer 720 may include a document collector 721, a coined word extractor 722, a coined word verifier 723, a coined word extraction improver 724, and a morpheme analysis improver 725. In this case, the language analyzer 720 of FIG. 7 may correspond to the language analysis apparatus 100 illustrated in FIG. 1, and thus, the document collector 721, the coined word extractor 722, the coined word verifier 723, the coined word extraction improver 724, and the morpheme analysis improver 725 illustrated in FIG. 8 may respectively correspond to the document collector 110, the coined word extractor 120, the coined word verifier 130, the coined word extraction improver 140, and the morpheme analysis improver 150 of FIG. 1.

In FIGS. 7 and 8, an example where "니로" which is not processed by conventional contextual customized advertisement technology is stored as a coined word in a morpheme dictionary in the sentence "니로는 전기모터를 시트 하단에 장착해 동급 최대의 적재공간을 구현했다" collected in FIG. 6 is illustrated.

The document collector 710 may collect various documents. To describe an operation of performing improved language analysis on '니로', an example of collecting a document where '니로' appears will be described below.

The document collector 721 of the language analyzer 720 may previously collect various documents and may provide the collected documents to the coined word extractor 722. For example, the document collector 721 may collect a sentence "친환경 브랜드 아이오닉과 니로를 내놨다" and a sentence "니로가 아이오 닉을 압도하고 좋은 신차임을 증명하였다" and may provide the collected documents to the coined word extractor 722.

Therefore, the coined word extractor 721 may extract '아이오닉', '니로', and '신차임' as coined words, based on postpositions '과, 을, 를'.

Moreover, the coined word verifier 723 may perform automatic verification and manual verification through dictionary and morpheme analysis to remove '신차임' from a coined word candidate and may maintain only '아이오닉' and '니로' as coined words.

Subsequently, the coined word extraction improver 724 may register '신차임', removed by the coined word verifier 723, in a stop word dictionary to improve a performance of the coined word extractor 722. Also, the morpheme analysis improver 725 may register '아이오닉' and '니로', which have passed verification by the coined word verifier 723, as nouns in a morpheme dictionary.

Therefore, the language analyzer 720 of the contextual advertisement intellectualization apparatus 700 of FIG. 7 may output a morpheme analysis result, shown in the following Table 9, of '니로' in the collected sentence by using a performance-improved morpheme analyzer.

TABLE 9

<니로 :NNG>는 <전기모터 :NNG>를 <시트 :NNG> <하단 :NNG>에 장착해
<동급 :NNG> <최대 :NNG>의 <적재공간 :NNG>을 구현했다.

Furthermore, the keyword extractor 730 may extract keywords as shown in the following Table 10.

TABLE 10

니로, 전기모터 시트, 하단, 동급 최대, 적재공간

Subsequently, the advertisement matcher 740 may extract '현대자동차' including '니로' as an advertisement candidate from among various advertisement targets registered in the advertisement database 750, based on the extracted keywords.

Then, the advertisement recommender 760 may finally recommend '현대자동차' as an advertisement suitable for the document from among the recommended advertisement candidates.

Figure 9:
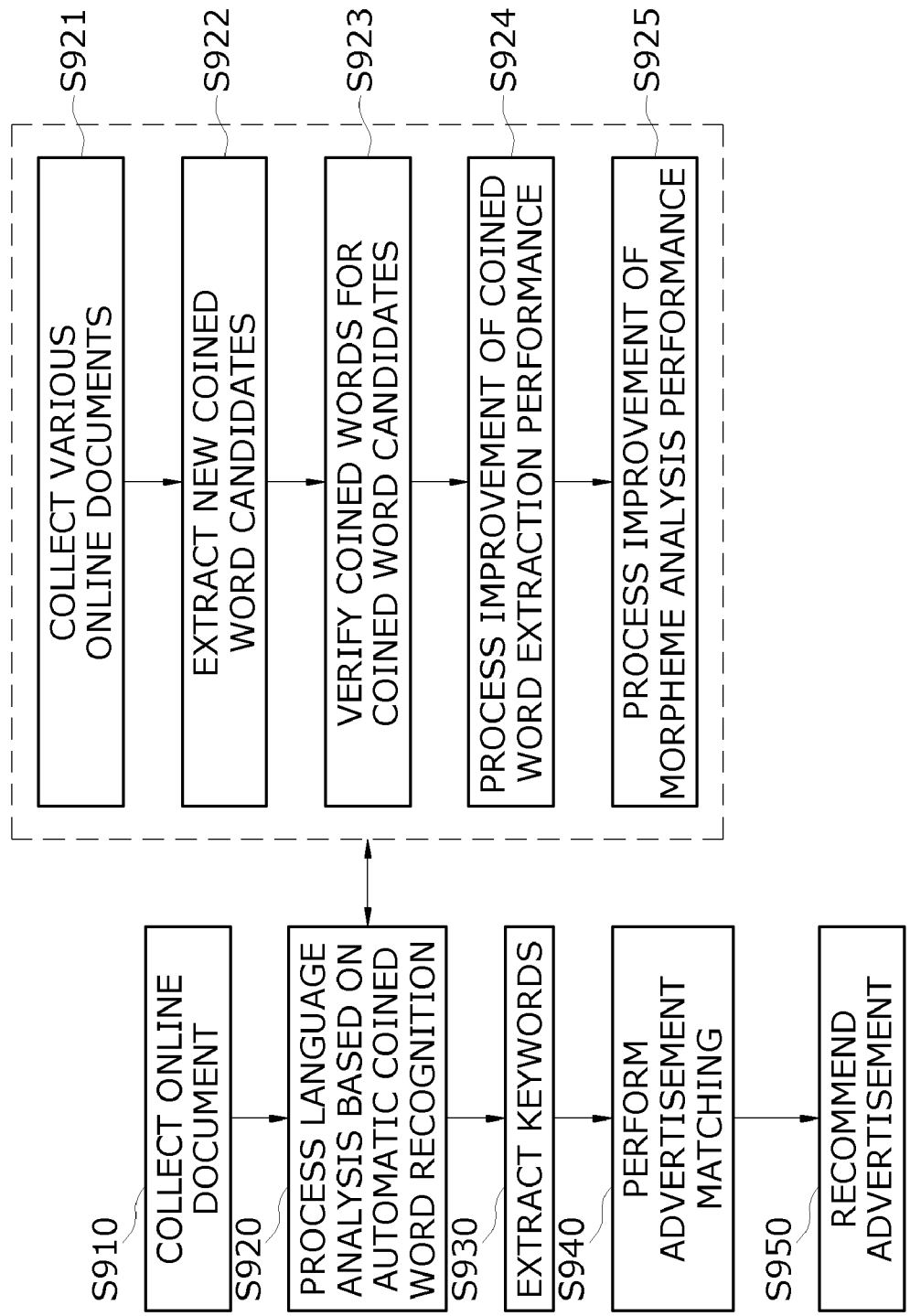
FIG. 9 is a flowchart for describing a contextual advertisement intellectualization service method according to an embodiment of the present invention.

FIG. 9 is a flowchart for describing a contextual advertisement intellectualization service method according to an embodiment of the present invention.

First, an online document which a relevant advertisement is to be inserted in may be collected in step S910.

Subsequently, in step S920, language analysis based on automatic coined word recognition may be performed on content of the collected online document to perform morpheme analysis.

In this case, a language analysis processing method based on automatic coined word recognition may first collect various online documents in step S921, extract new appearing coned word candidates from the collected documents in step S922, perform coined word verification on the extracted coined word candidates in step S923, refine a coined word extraction pattern and extend a stop word dictionary to improve performance according to whether the coined word candidates are nouns or not as a result of the coined word verification in step S924, and add a coined word, generated through the coined word verification result, to the morpheme dictionary to improve morpheme analysis performance in step S925.

The language analysis processing method based on automatic coined word recognition may correspond to the details described above with reference to FIGS. 1 to 5, 7, and 8.

Subsequently, in step S930, keyword extraction may be performed based on a morpheme analysis processing result based on automatic coined word recognition.

In this case, a word corresponding to a noun (a general noun, a proper noun, or the like) in the morpheme analysis processing result may be extracted as a keyword.

Subsequently, in step S940, a candidate may be detected from among advertisement targets registered in a dictionary, based on the extracted keyword.

Subsequently, in step S950, a suitable level and a correlation which match the document content may be calculated by grading a keyword-based priority of the detected candidate advertisement target, and a final advertisement target may be set and recommended.

Figure 10A:
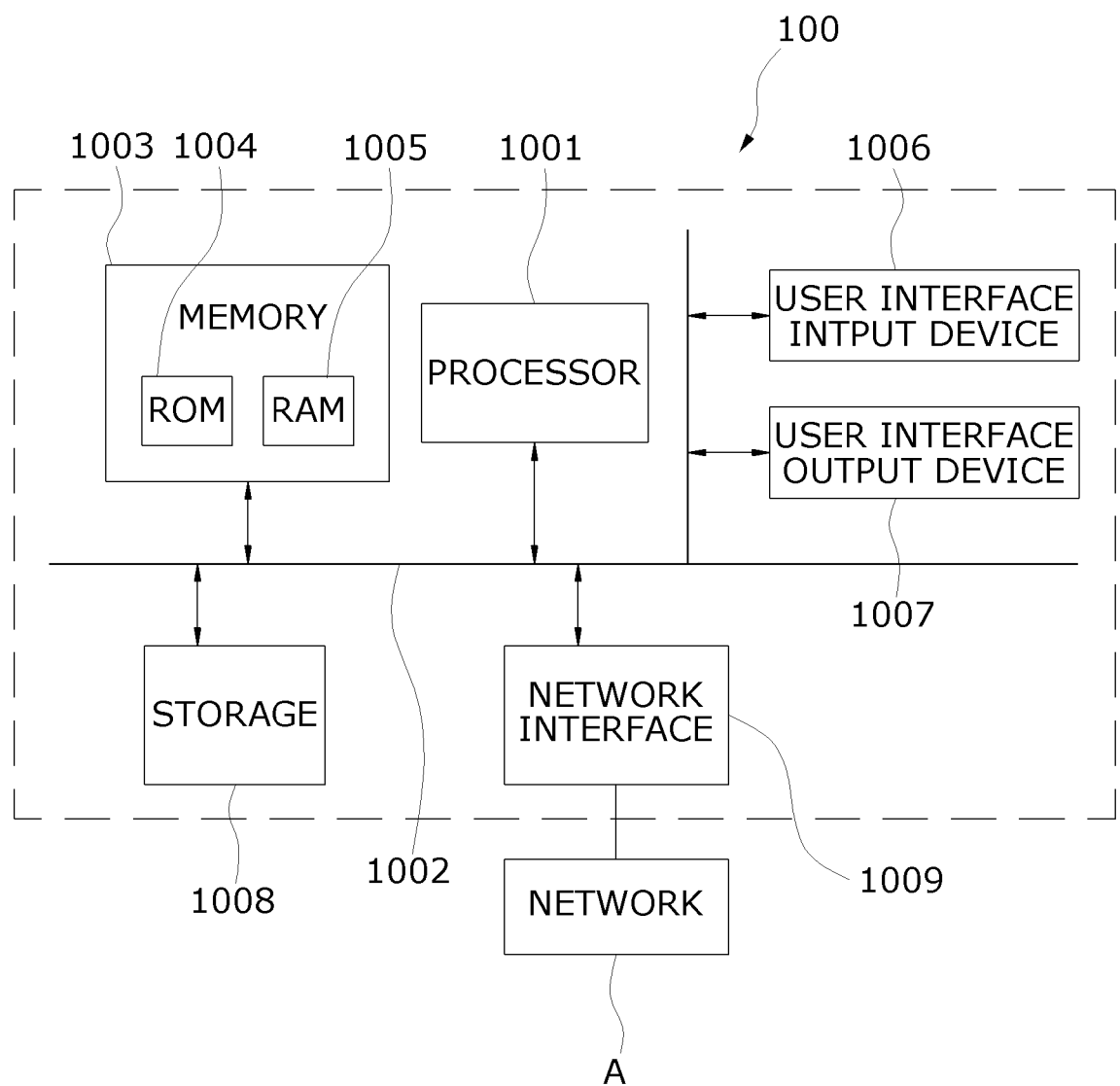
FIG. 10A and FIG. 10B are a block diagram of a language analysis apparatus and a contextual advertisement intellectualization apparatus according to an exemplary embodiment of the present invention.
Figure 10B:
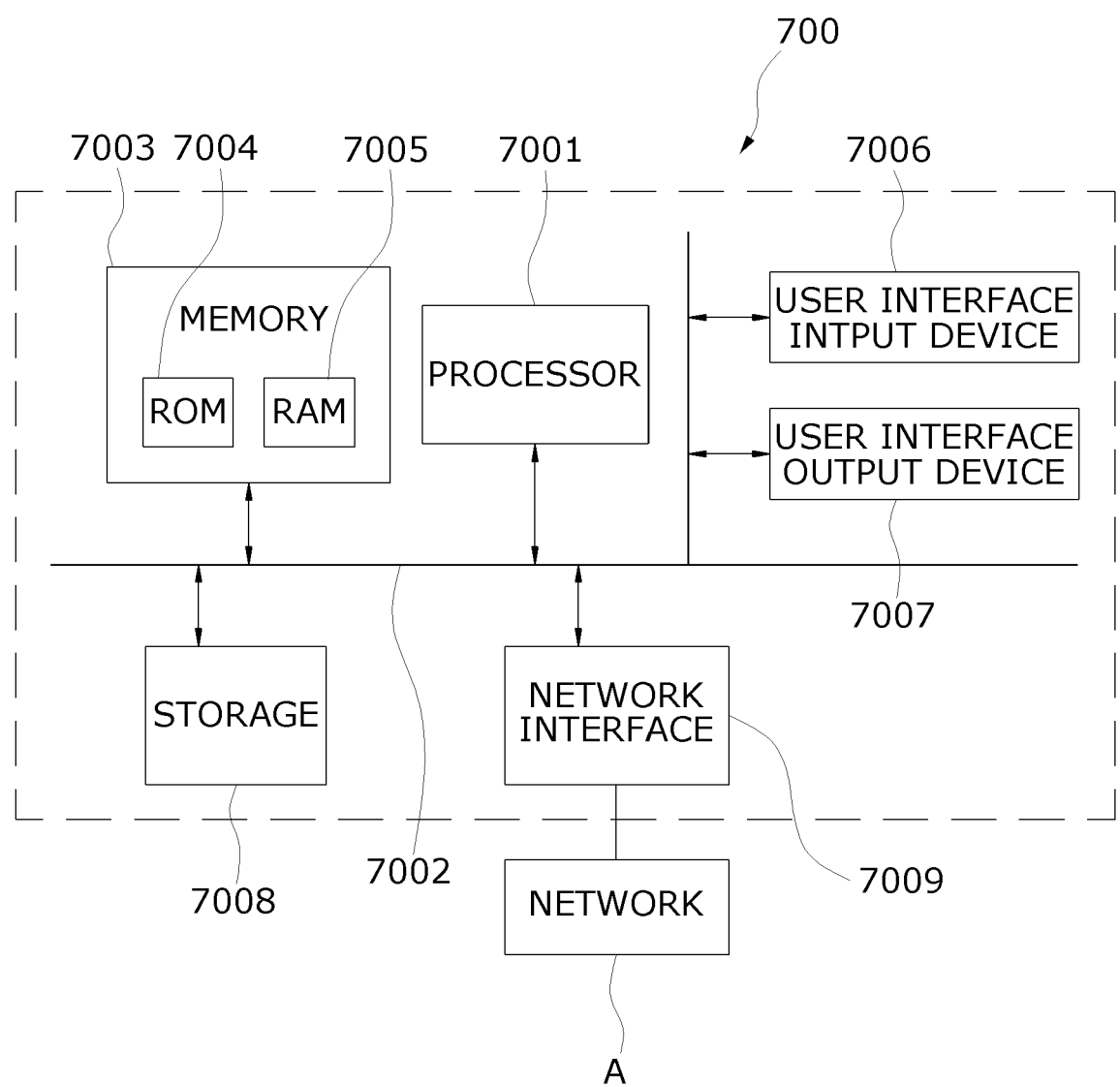

FIG. 10A and FIG. 10B are a block diagram of a language analysis apparatus and a contextual advertisement intellectualization apparatus according to an exemplary embodiment of the present invention.

An embodiment of the present invention may be implemented in a computer system, e.g., as a computer readable medium. As shown in in FIG. 10A and FIG. 10B, a computer system 100, 700 may include one or more of a processor 1001, 7001, a memory 1003, 7003, a user input device 1006, 7006, a user output device 1007, 7007, and a storage 1008, 7008, each of which communicates through a bus 1002, 7002. The computer system 100, 700 may also include a network interface 1009, 7009 that is coupled to a network A. The processor 1001, 7001 may be a central processing unit (CPU) or a semiconductor device that executes processing instructions stored in the memory 1003, 7003 and/or the storage 1008, 7008. The memory 1003, 7003 and the storage 1008, 7008 may include various forms of volatile or non-volatile storage media. For example, the memory may include a read-only memory (ROM) 1004, 7004 and a random access memory (RAM) 1005, 7005.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The language analysis apparatus for automatic coined word recognition and the online contextual advertisement intellectualization apparatus and method based on the same according to the embodiments of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system according to the embodiment of the present invention have been described in association with a specific embodiment, but their elements, some operations, or all operations may be implemented by using a computer system having general-use hardware architecture.

As described above, according to the embodiments of the present invention, a coined word may be extracted based on a coined word extraction pattern, the extracted coined word may be primarily and automatically verified by using a morphological analyzer, and a morphological dictionary and a coined stop word dictionary may be secondarily and automatically established based on a result of the automatic verification. Accordingly, a morphological dictionary which enables a previously misanalysed morpheme to be accurately analyzed may be provided, and thus, a coined stop word dictionary for decreasing a coined word extraction error may be provided, thereby improving a performance of a coined word extractor.

Moreover, according to the embodiments of the present invention, a morphological analyzer for accurately analyzing coined words included in a dictionary and learning data may be provided to automatically extract coined words, the extracted coined words may be automatically and manually verified, and a performance of each of a coined word extractor and a morphological analyzer is improved by using a result of the verification.

Moreover, according to the embodiments of the present invention, a performance of morpheme analysis technology which is an essential function for recommending an advertisement suitable for content of a document is improved in the advertisement field, and thus, customized advertisements are effectively recommended in the advertisement field where a number of coined words associated with new products appear.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A language analysis apparatus for processing coined word recognition, the language analysis apparatus comprising at least one processor and at least one memory comprising a set of computer instructions that when executed by the processor implement the following:

a document collector collecting an online document;

a coined word extractor performing coined word filtering on the collected document based on a predetermined coined word extraction pattern and a dictionary to extract a coined word candidate which corresponds to the coined word extraction pattern and is not registered in a coined stop word dictionary;

a coined word verifier performing morpheme analysis on the extracted coined word candidate to verify a coined word candidate which does not correspond to a predetermined part of speech and is not registered in a pre-stored morpheme dictionary;

a coined word extraction improver refining the coined word extraction pattern, based on a verification result of the coined word verifier and updating the verified coined word candidate in the coined stop word dictionary; and a morpheme analysis improver updating the verified coined word candidate in the morpheme dictionary, based on the verification result of the coined word verifier, wherein the coined word verifier is configured to:

extract a coined word candidate, which is not registered in the pre-stored morpheme dictionary, from among the coined word candidates extracted by the coined word extractor;

verify a part of speech of the coined word candidate, which is extracted as being unregistered in the morpheme dictionary, by using a morpheme analyzer, and determine whether to perform improvement of morpheme analysis performance and improvement of coined word extractor performance on the coined word candidate, if said word candidate is not registered in the morpheme dictionary and is not a predetermined part of speech.

2. The language analysis apparatus of claim 1, wherein the coined word extractor performs pattern-based filtering to extract coined word candidates which are not registered in a coined word pattern database pre-stored for each syntactic word in a sentence of the collected document, and performs dictionary-based filtering to extract a coined word candidate, which is not registered in a pre-stored stop word dictionary, from among the coined word candidates extracted as a result of the pattern-based filtering.

3. The language analysis apparatus of claim 1, wherein when it is verified as a result of the morpheme analysis that the coined word candidate is a part of speech different from a part of speech classified by the coined word extractor, the coined word extraction improver updates the coined word candidate in the coined stop word dictionary and refines a coined word extraction pattern associated with the coined word candidate.

4. The language analysis apparatus of claim 1, wherein when it is verified as a result of the morpheme analysis that the coined word candidate is the same part of speech as a part of speech classified by the coined word extractor, the morpheme analysis improver updates the coined word candidate in the morpheme dictionary.

5. A contextual advertisement intellectualization apparatus including the language analysis apparatus of claim 1, the contextual advertisement intellectualization apparatus comprising:
 a document collector collecting an online document which is to be advertised;
 a language analyzer performing morpheme analysis on the collected online document by using the language analysis apparatus;
 a keyword extractor extracting at least one keyword, based on a result of the morpheme analysis;
 an advertisement matcher extracting advertisement targets matching the extracted at least one keyword from among registered advertisement targets; and
 an advertisement recommender recommending an advertisement corresponding to an advertisement target, having a highest correlation with the extracted at least one keyword, from among the extracted advertisement targets.

6. A language analysis method based on a language analysis apparatus for processing coined word recognition, the language analysis method comprising:
 collecting an online document;
 performing coined word filtering on the collected document based on a predetermined coined word extraction pattern and a dictionary to extract a coined word candidate which corresponds to the coined word extraction pattern and is not registered in a coined stop word dictionary;
 performing morpheme analysis on the extracted coined word candidate to verify a coined word candidate which does not correspond to a predetermined part of speech and is not registered in a pre-stored morpheme dictionary;
 refining the coined word extraction pattern, based on a result of the verification and updating the verified coined word candidate in the coined stop word dictionary; and
 updating the verified coined word candidate in the morpheme dictionary, based on the result of the verification, wherein the performing of the morpheme analysis on the extracted coined word candidate to verify the coined word candidate comprises:
 extracting a coined word candidate, which is not registered in the pre-stored morpheme dictionary, from among the extracted coined word candidates;
 performing morpheme analysis to verify a part of speech of the coined word candidate which is extracted as being unregistered in the morpheme dictionary; and
 determining whether to perform improvement of morpheme analysis performance and improvement of coined word extractor performance on the coined word candidate, if said word candidate is not registered in the morpheme dictionary and is not a predetermined part of speech.

7. The language analysis method of claim 6, wherein the extracting of the coined word candidate comprises:
 performing pattern-based filtering to extract coined word candidates which are not registered in a coined word pattern database pre-stored for each syntactic word in a sentence of the collected document; and
 performing dictionary-based filtering to extract a coined word candidate, which is not registered in a pre-stored stop word dictionary, from among the coined word candidates extracted as a result of the pattern-based filtering.

8. The language analysis method of claim 6, wherein the improving of the coined word extraction comprises, when it is verified as a result of the morpheme analysis that the coined word candidate is a part of speech different from a part of speech classified through the extracting of the coined word candidate, updating the coined word candidate in the coined stop word dictionary and refining a coined word extraction pattern associated with the coined word candidate.

9. The language analysis method of claim 6, wherein the improving of the morpheme analysis comprises, when it is verified as a result of the morpheme analysis that the coined word candidate is the same part of speech as a part of speech classified through the extracting of the coined word candidate, updating the coined word candidate in the morpheme dictionary.

10. A contextual advertisement intellectualization method based on a language analysis method of processing coined word recognition, the contextual advertisement intellectualization method comprising:
 collecting an online document which is to be advertised;
 performing morpheme analysis on the collected online document, based on the processing of the coined word recognition;
 extracting at least one keyword, based on a result of the morpheme analysis;
 extracting advertisement targets matching the extracted at least one keyword from among registered advertisement targets; and
 recommending an advertisement corresponding to an advertisement target, having a highest correlation with the extracted at least one keyword, from among the extracted advertisement targets,
 wherein the language analysis method comprises:
 collecting an online document;
 performing coined word filtering on the collected document based on a predetermined coined word extraction pattern and a dictionary to extract a coined word candidate which corresponds to the coined word extraction pattern and is not registered in a coined stop word dictionary;
 performing morpheme analysis on the extracted coined word candidate to verify a coined word candidate which does not correspond to a predetermined part of speech and is not registered in a pre-stored morpheme dictionary;

refining the coined word extraction pattern, based on a result of the verification and updating the verified coined word candidate in the coined stop word dictionary; and updating the verified coined word candidate in the morpheme dictionary, based on the result of the verification, wherein the performing of the morpheme analysis on the extracted coined word candidate to verify the coined word candidate comprises:

extracting a coined word candidate, which is not registered in the pre-stored morpheme dictionary, from among the extracted coined word candidates;

performing morpheme analysis to verify a part of speech of the coined word candidate which is extracted as being unregistered in the morpheme dictionary; and determining whether to perform improvement of morpheme analysis performance and improvement of coined word extractor performance on the coined word candidate, if said word candidate is not registered in the morpheme dictionary and is not a predetermined part of speech.

* * * * *